United States Patent Office 3,233,149
Patented Feb. 1, 1966

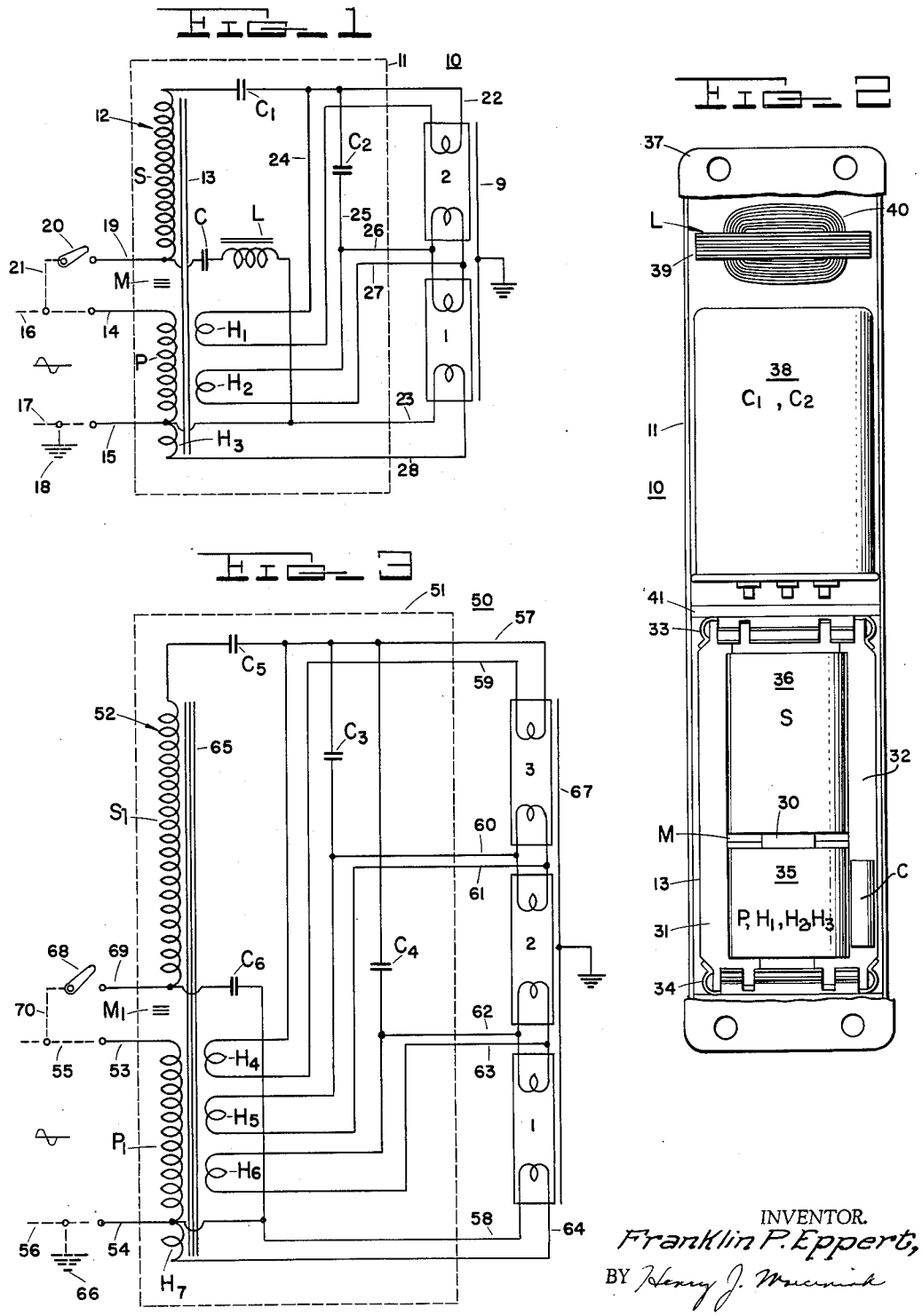

3,233,149
SYSTEMS AND BALLAST APPARATUS FOR OPERATING ELECTRIC DISCHARGE LAMPS AT TWO LEVELS OF ILLUMINATION
Franklin P. Eppert, Danville, Ill., assignor to General Electric Company, a corporation of New York
Filed Aug. 3, 1962, Ser. No. 214,610
9 Claims. (Cl. 315—259)

This invention relates to systems and ballast apparatus for operating electric discharge lamps such as fluorescent lamps. More particularly, it relates to such systems and ballast apparatus for operating such lamps at two levels of illumination.

An electric discharge lamp, such as a hot cathode fluorescent lamp, is comprised of an evacuated glass tube containing a small amount of mercury and an inert gas. The inside walls of the glass tube are coated with a thin layer of fluorescent powder. An electrode is provided at each end of the glass tube. The passage of current between the electrodes through ionized mercury vapor within the tube produces radiations which excite the fluorescent powder coating within the tube thereby causing it to emit light. When the average amount of the current supplied to a lamp is decreased, the rate at which the phosphor coating is being activated is reduced and consequently, the illumination level of the fluorescent lamp is reduced.

Where the hot cathode fluorescent lamps are operated at preselected levels of illumination, the electrodes must be heated continuously at a temperature which will provide sufficient electron emission from the cathodes at the preselected levels of illumination. Unless a continuous supply of heating current flows through the cathodes to maintain electron emission, the cathodes may be subjected to ion bombardment. This may result in the destruction of the active material with which the electrodes are coated and thereby shorten the life of the fluorescent lamp.

At any preselected level of illumination it is required, of course, that the ballast apparatus provide some means for limiting lamp current because of the negative impedance characteristic of the lamp. Also, the ballast apparatus must provide sufficient voltage to reignite the arc discharge in each half cycle of the alternating supply.

Difficulties in the operation of fluorescent lamps at low levels of illumination have been encountered when the lamps are operated at ambient temperatures below 50 degrees Fahrenheit. As the bulb wall temperature of a fluorescent lamp falls below a certain temperature, unstable lamp operation frequently results. In outdoor applications where the fluorescent lamps are used to illuminate signs and the like, it is particularly desirable that the lamps operate stably at low ambient temperatures such as are encountered during winter seasons.

In the past, various arrangements have been suggested for flashing or operating fluorescent lamps at two or more preselected levels of illumination. A ballast apparatus of this type is described and claimed in application Serial No. 184,227 filed on April 2, 1962, in the name of Harold W. Lord and assigned to the same assignee of the present invention. Although the ballast apparatus has been eminently satisfactory, in low temperature applications the high voltage required in the circuit to reignite the electric discharge in each half cycle has imposed a limit on the minimum illumination level at which the lamps can be operated. The present invention relates to an improvement of the ballast apparatus or ballast of the type described in the aforementioned patent appliaction wherein it is possible to operate the lamps at low illumination levels at relatively low temperatures.

Accordingly, it is the general object of the present application to provide an improved ballast apparatus for use in conjunction with a switching means whereby one or more electric discharge lamps are operated at two levels of illumination.

It is a more specific object of the present invention to provide an improved system for selectively operating one or more electric discharge lamps at two preselected levels of illumination.

Another object of the present invention is to provide an improved ballast apparatus for operating one or more hot cathode fluorescent lamps at relatively low temperature applications.

A further object of the present invention is to provide an improved ballast for operating one or more hot cathode fluorescent lamps at a normal level of illumination and at a relatively low level of illumination.

Still another object of the present invention is to provide an improved ballast apparatus and a system for operating fluorescent lamps that do not require a use of a potentiometer or variable reactor to provide the desider levels of illumination.

In accordance with one form of my invention, I have provided an improved apparatus for operating one or more electric discharge lamps for use in conjunction with a switching means. The ballast apparatus is comprised of a high leakage reactance transformer having a primary winding and a secondary winding inductively coupled on a magnetic core. When the switching means is in the closed or low impedance switching condition, a capacitor is in parallel circuit relation with the primary winding, the secondary winding is connected in autotransformer relation with the primary winding, and the lamp or lamps are operated at a first preselected level of the illumination. When the switching means is activated to an open or high impedance switching condition, the capacitor is effectively placed in series with the secondary winding and the primary winding thereby causing the lamps or lamp to be operated at a second preselected level of illumination.

According to another aspect of my invention, I have provided an inductor in series circuit with the capacitor. When the switching means is activated to its high impedance position, both the inductor and capacitor are effectively placed in the lamp circuit. It was found that with such an arrangement a fluorescent lamp or lamps could be switched or flashed to a lower level of illumination at a relatively low ambient temperature, for example at zero degrees Fahrenheit.

The subject matter which I regard as my invention is set forth in the appended claims. The invention itself, however, together with further objects and advantages thereof may be better understood by referring to the following description taken in connection with the accompanying drawings in which:

FIGURE 1 is a schematic circuit diagram of one embodiment of my invention;

FIGURE 2 is a plan view of the ballast apparatus shown schematically in FIGURE 1 in which the detailed circuit connections have been omitted; and FIGURE 3 is a schematic circuit diagram of an improved ballast apparatus for operating three serially connected electric discharge lamps in accordance with the invention.

Referring now more specifically to FIGURE 1 of the drawings, I have illustrated therein a ballast apparatus 10 incorporating one from of my invention for operating a pair of hot cathode type of fluorescent lamps 1, 2 at preselected level of illumination. The ballast apparatus 10 is shown enclosed in a dashed rectangle which schematically represents a ballast case 11 or other enclosure means such as an encapsulant. A grounded inductive plate 9, which in most applications is the lamp fixture, is positioned in proximity to lamps 1 and 2 so as to be capacitively coupled with the lamps.

The voltage transforming and current limiting function of the ballast apparatus 10 is carried out by a high leakage reactance ballast transformer 12. The high leakage reactance ballance transformer 12 includes a primary winding P, magnetic shunts M, and a secondary winding S inductively coupled with the primary winding P on a magnetic core 13. Cathode heating windings $H_1$, $H_2$ and $H_3$ are closely coupled with the primary winding P and provide continuous heating current to the lamps 1, 2 when the ballast apparatus 10 is energized. A pair of input terminal leads 14, 15 connected in circuit with the primary winding P are provided for connection to a suitable alternating power supply lines 16, 17, such as a 120 volt, 60 cycle supply. The grounded supply line 17 or low potential side of the power supply is shown connected in circuit with a ground 18. The high potential side of the power supply is generally identified as the supply line 16.

Since hot cathode fluorescent lamps were used in the illustrative embodiment of my invention, it was necessary to maintain a continuous supply of current to the lamp cathodes. It will be seen that output lead 22 and electrical leads 24 and 25 connect heating winding $H_1$ in circuit with a cathode of lamp 2. Connections 26 and 27 connect cathode heating winding $H_2$ in circuit with a cathode of lamps 1 and 2. Similarly, the cathode heating winding $H_3$ is connected in circuit with a cathode of lamp 1 by output lead 23 and lead 28.

It will be seen that the lower end of the secondary winding S as seen in FIGURE 1, is connected to a switching lead 19 which is brought out of the ballast case 11 for connection to a switching means 20. The switching means 20 is schematically shown as a single pole, single throw switch, which is connected to the high potential supply line 16 by a lead 21. It will be noted that the lower end of the secondary winding S is also connected in series circuit relation with a capacitor C and an inductor L. When the switching means 20 is in the open or high impedance switching condition, the capacitor C and the inductor L are effectively placed in the lamp circuit which includes the secondary winding S, a series capacitor $C_1$, an output lead 22, lamps 1, 2 and an output lead 23. The network which includes the serially connected capacitor C and the inductor L has a predetermined net capacitive value such that when the switching means 20 is in the open position, the desired illumination level in the lamps 1 and 2 can be obtained.

I have found that the provision of additional inductive reactance or the inclusion of the inductor L in series with the capacitor C resulted in stable low temperature operation. The value of the inductance required was experimentally determined by operating the ballast apparatus 10 in an ambient temperature of zero degrees Fahrenheit. A value of inductance was selected that would stabilize the operation of the lamps 1, 2 at zero degrees Fahrenheit. The capacitor C introduced the desired amount of capacitive reactance required to operate lamps 1, 2 at a second preselected level of illumination.

The inductor L was built up of adjacent stacks of E-shaped laminations and I-shaped laminations. The inductor winding was wound with paper insulation interleaved between layers of the winding and was disposed on the middle leg of the E-shaped stack of laminations.

Referring now more specifically to FIGURE 2, it will be seen that the magnetic core 13 has a central winding leg 30 and side yoke members 31, 32, which are firmly held in assembled relation with the central winding leg 30 by clamping elements 33, 34. The primary winding P and the cathode heating windings $H_1$, $H_2$, $H_3$ are incuded in a coil assembly 35. Also, disposed on the central winding leg 30 alongside and spaced from the coil assembly 28 is a second coil assembly 36 containing the secondary winding S.

As will be seen in FIGURE 2, the coil assemblies 35 and 36 are placed side by side on the central winding leg 30 and are separated by magnetic shunts M. It will be understood that the leakage reactance of a ballast transformer may be readily increased by the inclusion of a high reluctance leakage path or shunts M of magnetic material between the coil assembly 35 containing the primary winding P and the coil assembly 36 containing the secondary winding S.

A high leakage reactance type of transformer is used in the ballast apparatus 10 since it is necessary to limit the current flow in the lamp circuit because of the negative resistance characteristic of the electric discharge lamps 1 and 2. It will be appreciated, of course, that the flux leakage paths may be formed either through nonmagnetic material, such as air, or through magnetic material by the provision of projecting shunt legs formed on the side of the yoke members 31, 32 or by insertable shunts M, such as I have employed in the illustrated embodiment of my invention.

For the purpuose of indicating the physical arrangement of the ballast apparatus 10, I have shown the components of the apparatus 10 disposed in an elongated ballast case 11 which is covered with a cover plate 37, only a portion of which is shown. It will be noted that a two-section capacitor 38 includes the capacitor $C_1$ and the series capacitor $C_2$. A separate tubular capacitor was used as the capacitor C. As shown in FIGURE 2, the capacitor C may be placed next to the coil assembly 35. It will be appreciated that the capacitor C may be placed in other locations as convenience requires. The terminals of the two-section capacitor 38 are insulated from the magnetic core 13 by an insulator 41. The inductor L is comprised of a magnetic core 39 and a coil 40.

Where the components of the ballast apparatus 10 are enclosed in a ballast case 11, the components are usually covered with a potting compound. As shown in FIGURE 2, the ballast apparatus 10 has not been potted. It will be appreciated that in some applications the components of the ballast apparatus 10 may be encapsulated in a suitable resinous material and a metallic type of case or cannister may not be required.

Turning again to the schematic diagram of the ballast apparatus 10 illustrated in FIGURE 1, the operation of the apparatus 10 will be more fully described. Assuming that the switching means 20 is in the closed position or in the low impedance switching condition, the combined voltages across the primary winding P and the secondary winding S are applied initially across lamp 1, since the starting capacitor $C_2$ effectively shunts lamp 2 during the starting condition. Starting of lamp 1 is aided by a small auxiliary current flow between a cathode of the lamp 1 and the conductive plate or fixture 9 disposed in capacitive relationship with the lamp 1.

After lamp 1 has started, the voltage across the starting capacitor $C_2$ is sufficient to start the lamp 2. After both lamps 1 and 2 have started, the impedance presented by the starting capacitor $C_2$ is relatively greater than the lamp impedance. Consequently, there is no significant current flow through the starting capacitor $C_2$ during operation.

For the switching condition of the ballast apparatus 10 when the switch means 20 is closed, the network containing the serially connected capacitor C and inductor L is essentially ineffective in the lamp circuit. During this condition of the ballast apparatus 10, the secondary winding S is connected in autotransformer relation with the primary winding P, and the voltages across the primary winding P and the secondary winding S, which are in additive relationship, are applied across the serially connected lamps 1 and 2. When the switching means 20 is in the open position or high impedance switching condition, it will be seen that the secondary winding S is disconnected from the primary winding P and the capacitor C and inductor L are effectively placed in the lamp circuit. For this switching condition, the voltage across the primary winding P is excluded from the lamp circuit. Due to the increased reactance introduced into the lamp circuit by the capacitor C, the level of illumination of the lamps 1, 2 falls to a lower preselected level.

It was found that excluding the primary voltage from the lamp circuit made it possible to operate the lamps 1, 2 at lower illumination levels as compared to an arrangement in which the primary winding voltage was included in the lamp circuit. Further, it was found that more stable lamp operation could be achieved at relatively lower temperatures, such as zero degrees Fahrenheit, by the use of the inductor L connected in series with the capacitor C. As was previously described, the inductance of the inductor L was determined experimentally by operating the apparatus in an ambient temperature of zero degrees Fahrenheit or other desired temperature level and selecting the value of the inductance that provided the stable operation for the particular lamps used and for the desired temperature.

From the foregoing description of the apparatus shown in FIGURES 1 and 2, it will be apparent that an improved ballast apparatus has been provided wherein it is possible to flash or dim fluorescent lamps from one selected level of illumination to a lower level of illumination that will provide stable operation at low dimming levels and at low ambient temperatures.

In order to demonstrate the advantages of the present invention, the ballast apparatus 10 shown in FIGURE 1 was constructed and tested by operating a pair of 72 inch high output fluorescent lamps from a 120 volt, 60 cycle source. The apparatus was used for the purpose of flashing the fluorescent lamps. For the convenience of those desiring to practice the invention, the following components are described by way of an exemplification of the invention:

| | |
|---|---|
| Primary winding P | 381 turns of .0285 inch copper wire. |
| Secondary winding S | 1426 turns of .0226 inch copper wire. |
| Capacitor $C_1$ | 2.3 microfarads, 270 volts. |
| Cathode heating windings $H_1$, $H_3$ | 14 turns of .0285 inch copper wire. |
| Cathode heating winding $H_2$ | 15 turns of .0285 inch copper wire. |
| Capacitor $C_1$ | 4.0 microfarads, 570 volts. |
| Capacitor $C_2$ | .075 microfarads, 570 volts. |
| Inductor L | 2 henries. |

With an inductive value of 2.0 henries for the inductor L and a capacitance of 2.3 microfarads for the capacitor C, it was possible to provide a second level of illumination which was approximately 30 percent of the standard rated lumen output of the fluorescent lamps used. Further, the apparatus 10 stably operated the lamps 1, 2 at a temperature of zero degrees Fahrenheit. It will be appreciated that where the capacitor C was switched in and out of series circuit relation with the secondary and primary windings without the arrangement of the invention, the lamps could not be stably operated below approximately 60 percent of the standard rated lumen output of the lamps 1, 2. It will be understood that in flashing applications it is particularly desirable that the flashing occur between the normal or high illumination level and a second or relatively low level. The ballast apparatus 10 in accordance with the invention provided reliable low temperature starting and operation at the lower illumination levels and is particularly adaptable for flashing applications.

In FIGURE 3, I have illustrated another form of my invention embodied in ballast apparatus 50 for operating three serially connected fluorescent lamps 1, 2 and 3. The ballast apparatus 50 is shown enclosed in a dashed rectangle which schematically represents the ballast case 51 or other enclosure means such as a resinous encapsulant.

The ballast apparatus 50 is comprised of a ballast transformer 52, a pair of input leads 53, 54 for connection to an alternating power supply represented by supply lines 55, 56, a pair of starting capacitors $C_3$, $C_4$, a series capacitor $C_5$, a dimming capacitor $C_6$, output leads 57, 58 and electrical leads 59, 60, 61, 62, 63 and 64 for connecting the cathode heating windings $H_4$, $H_5$, $H_6$ and $H_7$ in circuit with the lamps 1, 2 and 3. The ballast transformer is comprised of a magnetic core 65 of the shell type, on which a primary winding $P_1$, a secondary winding $S_1$ and cathode heating windings $H_4$, $H_5$, $H_6$ and $H_7$ are inductively coupled. Magnetic shunts $M_1$ are interposed between the primary winding $P_1$ and secondary winding $S_1$.

It will be noted that I have shown the input lead 53 which is generally designated as the black lead of the ballast apparatus 50 as being connected in circuit with the high potential side of the alternating power supply. Input lead 54 or the lead which is generally designated as the white lead of the ballast apparatus 50 is connected in circuit with the low potential or grounded side of the power supply. The grounded power supply line is identified by the connection to a ground 66. Fluorescent lamps 1, 2 and 3 are shown disposed in close proximity to a grounded conductive plate or a fixture 67. The conductive plate 67 is essentially at ground potential.

In order to connect the apparatus 50 in circuit with a switch 68, a switching lead 69 is brought out externally from the ballast case 51. It will be seen that when switch 68 is closed, one end of the secondary winding $S_1$ is connected in circuit with one end of the primary winding $P_1$ through a connection 70, the supply line 55 and input lead 53. Thus, when switch 68 is closed, the secondary winding $S_1$ is in circuit with one of the primary windings $P_1$ so that the voltage across the primary winding $P_1$ is applied across the lamps 1, 2 and 3. Due to the relatively high impedance of the dimming capacitor C, which is connected in parallel with the primary winding $P_1$ when the switch 68 is closed, the current flow through the capacitor $C_6$ is negligible. However, when switch 68 is opened, the connection placing the primary winding $P_1$ in parallel circuit with the capacitor $C_6$ is broken, and the capacitor $C_6$ is effectively in the lamp circuit.

It will be appreciated that the switching means used in conjunction with the ballast apparatus of the present invention may consist of a single pole, single throw hand-actuated switch or may be a mechanically or electronically actuated switching means where the ballast apparatus is used to flash fluorescent lamps from one preselected level to another. It is an essential requirement of the switching means that in one switching condition it provide a low impedance in the path of current flow and in the other switching condition that it provide a high impedance in the path of current flow.

In accordance with the arrangement of the present invention, the dimming capacitor $C_6$ is connected in circuit with one end of the secondary winding $S_1$ and in circuit with the output lead 58 which is adapted for connection to the low potential or grounded side of the supply line. Thus, when the switch 68 is in its high impedance condition, the voltage across the primary winding $P_1$ is effectively excluded from the lamp operating circuit, and essentially, the dimming capacitor $C_6$, the secondary windings $S_1$ and the series capacitor $C_5$ are effectively in the lamp operating circuit. When the switch is closed or activated to the low impedance condition, the secondary windings $S_1$ is connected to the end of the primary winding which is connected in circuit with the input lead 54.

The operation of the ballast apparatus 50 shown in FIGURE 3 is essentially similar to the operation of the apparatus 10 of FIGURE 1. When the switch 68 is in the closed position and the apparatus 50 is energized, the combined voltages across the primary winding $P_1$ and the secondary winding $S_1$ are initially applied to lamp 1, since the starting capacitors $C_3$, $C_4$ cause lamps 2 and 3 to be shunted. The starting of lamp 1 is also aided by a small auxiliary current flow between a lamp cathode and the conductive plate 67 disposed in capacitive relationship therewith. After lamp 1 has started, the voltage across the starting capacitor $C_4$ is essentially applied across lamp 2 to cause it to start. When both lamps 1 and 2 have started, the voltage across the capacitor $C_3$ is sufficient to start lamp 3. It will be appreciated that this sequential starting of lamps 1, 2, 3 is substantially instantaneous and normally would not be discernible to the human eye.

With switch 68 closed, lamps 1, 2 and 3 are operated at their normal or first level of illumination. When switch 68 is opened, the light output drops to a level as determined by the value of the capacitance of dimming capacitor $C_6$. When the lamps 1, 2 and 3 are operated at a low level of illumination, it was found that by switching of the primary winding so that the primary voltage does not appear in the lamp circuit, the lamp could be operated at as low as 30 percent of the rated lumen output of the lamps.

From the foregoing description of the operation of the improved ballast apparatus of the invention, it will be apparent that it is possible to operate one or more lamps at two preselected levels of illumination wherein more stable operation at lower levels of illumination can be readily achieved. Further, it will be apparent that it is possible to operate the lamp at two preselected levels without need for a potentiometer or variable reactor.

It will be understood that the specific embodiments of the invention which I have described herein may be changed or varied without departing from the principle of the invention. For example, the switching lead arrangement of the present invention is readily adapted to other ballast circuits. It is to be understood, therefore, that I intend by the appended claims to cover all such changes and modifications that fall within the true spirit and scope of the invention.

What I claim as new and desire to secure by Letters Patent of the United States is:

1. A system for operating fluorescent lamps from an alternating power source at a first and second level of illumination, said system comprising: a plurality of fluorescent lamps, an alternating power source, a high reactance transformer having a primary winding and a secondary winding inductively coupled therewith on a magnetic core, a pair of input leads connected with the alternating power source, said primary winding being connected in circuit with said input leads for generation from the alternating power source, circuit means including at least a pair of output leads connected in electrical circuit with said fluorescent lamps for supplying the operating potential to said fluorescent lamps, one of said output leads being connected in circuit with said secondary winding and the other of said output leads being connected with one end of said primary winding, a switching lead connected in circuit with one end of said secondary winding, a switching means connected in electrical circuit with said switching lead and said primary winding and operable between at least a first condition and a second condition, said switching means when activated to said first condition providing a low impedance path for current flow from the alternating power source to said secondary winding and connecting said secondary winding in autotransformer relation with said primary winding thereby causing the voltage across both said primary winding and said secondary winding to be applied across said output leads to operate said lamp at the first level of illumination, a serially connected capacitor and inductor, said serially connected capacitor and inductor being connected at one end thereof in circuit with said secondary winding and at the other end thereof in circuit with said primary winding, said switching means when activated to said second condition providing a high impedance between said secondary winding and said primary winding whereby the voltage across said primary winding is excluded from the voltage across said output leads, said serially connected capacitor and inductor being effectively placed in series circuit relation with said secondary winding to operate the lamps at the second level of illumination.

2. A ballast apparatus for use in conjunction with a switching means for operating a plurality of flourescent lamps from an alternating power source at a first and a seocnd level of illumination, said ballast apparatus comprising a high reactance transformer having a primary winding and secondary winding inductively coupled therewith on a magnetic core, a pair of input leads for connection with the alternating power source, said primary winding being connected across said input leads, a switching lead connected in circuit with one end of said secondary winding and brought out externally of said apparatus for connection with the switching means, to connect one end of the primary winding in electrical circuit with said one end of the secondary winding a series capacitor connected in series circuit relation with said secondary winding, a serially connected capacitor and inductor connected in circuit with said one end of said secondary winding and with the other end of said primary winding, circuit means including at least a pair of output leads, one of said output leads being connected in circuit with said other end of said primary winding and the other of said output leads being connected in circuit with said serially connected secondary winding and series capacitor, a switching means connected in circuit with one end of said primary winding and said switching lead, said switching means when closed connecting said one end of said secondary winding in circuit with one end of said primary winding to cause the voltage across the primary winding to be included in the voltage supplied at the output leads, and said switching means when opened disconnecting said one end of the primary winding from said one end of the secondary winding to exclude the voltage across the primary winding from the voltage supplied at the output leads and effectively placing said serially connected capacitor and inductor in circuit with the output leads to operate the fluorescent lamps at the second level of illumination.

3. A ballast apparatus for operating a pair of serially connected fluorescent lamps at a first and a second level of illumination and for use in conjunction with a switching means, said serially connected fluorescent lamps being changed from one of said levels of illumination to the other level of illumination when said switching means is activated from a first switching condition to a second switching condition, said ballast apparatus comprising: a magnetic core having a primary winding and a high leakage reactance secondary winding inductively coupled thereon, said secondary and said primary windings being wound in voltage aiding relation, a pair of input leads on said primary winding for connection to the alternating power source, one of said input leads being adapted for connection to the high potential side and the other input lead being adapted for connection to the low potential side of said alternating power source, a switching line connected to one end of said high reactance secondary winding and brought out externally from said apparatus for connection in circuit with said switching means, said switching means when activated to said first switching condition connecting said secondary winding in circuit with the high potential side of the power supply, said switching means when activated to said second switching condition disconnecting said input lead adapted for connection with the high potential side of the power supply from said secondary winding, a dimming capacitor connected in circuit with one end of the high leakage reactance secondary winding and with one end of the primary winding, a series capacitor connected in series circuit relation with said high leakage reactance secondary winding, circuit means including a starting capacitor, an output lead for connecting said input lead adapted for connection to the low potential side of the power source and an output lead for connecting said series capacitor in circuit with said serially connected fluorescent lamps, said circuit means including electrical leads for connecting said starting capacitor in shunt with one of said lamps, said apparatus providing at said output leads an autotransformer type of voltage including the voltage across the primary winding when said switching means is activated to said first condition to operate said serially connected fluorescent lamps at the first level of illumination and said apparatus providing a voltage at said output leads wherein the voltage across the high reactance secondary winding is included in the voltage across said primary winding is excluded from the voltage at said output leads when said switching means is activated to said second condition thereby to operate said lamps at a second level of illumination.

4. A ballast apparatus for operating fluorescent lamps at a first and a second level of illumination and for use in conjunction with a switching means, said fluorescent lamps being operated at a first level of illumination when said switching means is in a first switching condition and at a second level of illumination when said switching means is in a second switching condition, said ballast apparatus comprising: a ballast transformer having a primary winding and a high reactance secondary winding inductively coupled on a magnetic core, a pair of input leads for connection to an alternating power source provided by a grounded line and an ungrounded line, said input leads being connected in circuit with said primary winding, one of said input leads being adapted for connection to said grounded line of the alternating power source and the other of said input leads being adapted for connection to said ungrounded line of the alternating power source, a switching lead connected in circuit with one end of the high reactance secondary winding and adapted for connection to said switching means, circuit means including at least a pair of output leads for supplying the output of the apparatus to said lamps, one of said output leads being connected in circuit with said secondary winding and the other of said output leads being connected in circuit with said one input lead adapted for connection to said grounded line of the power source, said switching means when activated to said first switching condition connecting said secondary winding in autotransformer relation with said other input lead adapted for connection to said ungrounded line of the power source, a serially connected capacitor and inductor connected in circuit with said one end of said high reactance secondary winding and in circuit with said one input lead adapted for connection to said grounded line of the power source, and circuit means including a series capacitor joined in electrical circuit with said one end of said secondary winding and with one of said output leads adapted for connection with said fluorescent lamps, said apparatus providing at said output leads a voltage including at least the voltage across said primary winding and said secondary winding to operate said lamps at the first level of illumination when said switching means is activated to said first switching condition, said serially connected capacitor and inductor being effectively placed in circuit with said output leads and said voltage across said primary winding being excluded from the voltage provided at said output leads to operate the fluorescent lamps at the second level of illumination when said switching means is activated to said second switching condition.

5. A system for operating fluorescent lamps at a first and a second level of illumination, said system comprising an alternating power source having a grounded side and an ungrounded side, a plurality of fluorescent lamps, a ballast transformer having at least a primary winding and a secondary winding inductively coupled on a magnetic core, said primary winding having one end thereof connected to said ungrounded side of the power source and having the other end thereof connected to said grounded side of the power source, a capacitor connected in circuit with one end of said secondary winding and said other end of said primary winding, a switching means, said switching means being connected in circuit with one side of the power source and with said one end of said secondary winding, said switching means when activated to a first switching condition providing a low impedance path for current flow and when activated to a second switching condition providing a high impedance path for current flow, circuit means including output leads for supplying the output of said apparatus to said lamps, said output leads connecting the other end of said secondary winding and said other end of said primary winding connected to said grounded side of the power source in circuit with said lamps, said secondary winding being connected in autotransformer relation with said primary winding to provide a voltage across said output leads that includes the voltage across said primary winding and said secondary winding to operate said lamps at the first level of illumination when said switching means is activated to the first switching condition, said capacitor being effectively placed in circuit with said output leads and said one end of said secondary winding being disconnected from said one end of said primary winding connected to said ungrounded side of the power source when said switching means is activated to the second switching condtion, thereby to provide a running voltage across said output leads that excludes the voltage across the primary winding to operate the lamps at a second preselected level of illumination.

6. A system for operating fluorescent lamps at a first and a second level of illumination comprising: an alternating power source having an ungrounded side and a grounded side, a ballast transformer having a primary winding and a high reactance secondary winding inductively coupled therewith on a magnetic core, one end of said primary winding being connected in circuit with said ungrounded side of said power source and the other end thereof being connected in circuit with said grounded side of said power source, a switching means connected in circuit with said one end of said primary winding and one end of said secondary winding, said switching means being activated from a high impedance to a low impedance switching condition, a first series capacitor connected in circuit with the other end of said secondary winding, a serially connected capacitor and inductor connected in circuit with said one end of said secondary winding and in circuit with said other end of said primary winding, circuit means for supplying the output of the apparatus to the fluorescent lamps and including output leads, one of said output leads being connected in circuit with said other end of said primary winding and another of said output leads being connected in circuit with the secondary winding whereby when said switching means is activated to said low impedance condition an operating voltage including the voltage across said primary winding and said secondary winding is supplied at the output leads to operate said lamps at the first level of illumination and whereby when the switching means is activated to said high impedance switching condition said serially connected capacitor and inductor are effectively placed in circuit with said output leads and the voltage across the primary winding is excluded from the voltage supplied at the output leads thereby to operate said lamps at the second level of illumination.

7. A ballast apparatus for operating at least one fluorescent lamp from an alternating power source and for use in conjunction with a switching means connected in circuit with the high potential side of the power supply and adapted for connection with the ballast apparatus, said ballast apparatus comprising: a high leakage reactance transformer having a primary winding and a secondary winding inductively coupled therewith on a magnetic core, a pair of input leads for connection to the power source, one of said input leads being connected to one end of said primary winding and the other of said input leads being connected to the other end of said primary winding, a switching lead connected in circuit with one end of said secondary winding and brought out externally of said apparatus for connection to said switching means, circuit means including at least a pair of output leads for supplying the output of the apparatus to said at least one fluorescent lamp, one of said output leads being connected in circuit with the other end of said secondary winding and the other of said output leads being connected in circuit with said other end of said primary winding, a serially connected capacitor and inductor, said serially connected capacitor and inductor being connected between said one end of said secondary winding and said other end of said primary winding, said switching means when activated to a first switching condition causing said serially connected capacitor and inductor to be placed in parallel circuit with said primary winding and to be essentially ineffective so that the voltage across the primary winding and the secondary winding is supplied at the output leads to operate said at least one fluorescent lamp at the first level of illumination, and said switching means when activated to a second switching condition causing said serially connected capacitor and inductor to be placed in series circuit relation between said primary winding and said secondary winding and to be effective so that the voltage across the primary winding is excluded from the output leads to operate said at least one fluorescent lamp at the second level of illumination.

8. A ballast for operating at least one electric discharge lamp from a source of alternating current power, said ballast comprising: a high reactance transformer having a primary winding and a secondary winding inductively coupled therewith on a magnetic core; a pair of input leads for connection to said alternating current power source; means connecting one of said input leads to one end of said primary winding and the other of said input leads to the other end of said primary winding; a pair of output leads for connection to said at least one electric discharge lamp; means connecting one of said output leads to one end of said secondary winding and the other of said output leads to said other end of said primary winding; a dimming circuit comprising a capacitor and having one end coupled to said other output lead; and switching means having at least first and second switching conditions coupled between said one end of said primary winding, the other end of said secondary winding, and the other end of said dimming circuit; said switching means being arranged to connect said primary and secondary windings in voltage adding relation relative to said output leads in said first switching condition and being arranged to disconnect said primary and secondary windings so that said other end of said secondary winding is coupled only through said dimming circuit to said other output lead in said second switching condition.

9. The ballast of claim 8 wherein said dimming circuit further comprises an inductor in series with said capacitor.

References Cited by the Examiner
UNITED STATES PATENTS

| | | | |
|---|---|---|---|
| 2,659,037 | 11/1953 | Claude | 323—76 X |
| 2,866,133 | 12/1958 | Strange et al. | 315—95 |
| 3,091,720 | 5/1963 | Huberty | 315—100 |

GEORGE N. WESTBY, *Primary Examiner.*

D. E. SRAGOW, *Assistant Examiner.*